(12) United States Patent
Ikeda et al.

(10) Patent No.: US 10,894,351 B2
(45) Date of Patent: Jan. 19, 2021

(54) CLIP-TYPE STRETCHING APPARATUS

(71) Applicant: Toshiba Kikai Kabushiki Kaisha, Tokyo (JP)

(72) Inventors: Yoshihisa Ikeda, Shizuoka (JP); Michihiko Saito, Mishima (JP); Yuichi Watanabe, Numazu (JP); Hiroaki Kato, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/814,864

(22) Filed: Nov. 16, 2017

(65) Prior Publication Data
US 2018/0071973 A1    Mar. 15, 2018

Related U.S. Application Data

(63) Continuation of application No. PCT/JP2016/064783, filed on May 18, 2016.

(30) Foreign Application Priority Data

May 19, 2015 (JP) .................... 2015-101752

(51) Int. Cl.
*B29C 55/16* (2006.01)
*B29C 55/20* (2006.01)
*B29K 101/12* (2006.01)

(52) U.S. Cl.
CPC ............ *B29C 55/165* (2013.01); *B29C 55/20* (2013.01); *B29K 2101/12* (2013.01)

(58) Field of Classification Search
CPC .... B29C 55/165; B29C 55/20; B29K 2101/12
See application file for complete search history.

(56) References Cited

U.S. PATENT DOCUMENTS

| 4,807,336 A | 2/1989 | Yoshimura et al. |
| 2009/0199374 A1* | 8/2009 | Sano ..................... B29C 55/165 24/67 R |
| 2010/0062097 A1 | 3/2010 | Sano et al. |

FOREIGN PATENT DOCUMENTS

| CN | 101489761 | 7/2009 |
| CN | 102485471 | 6/2012 |
| JP | 44-7155 | 3/1969 |

(Continued)

OTHER PUBLICATIONS

International Search Report issued in PCT/JP2016/064783 dated Aug. 2, 2016.

(Continued)

*Primary Examiner* — Michael N Orlando
*Assistant Examiner* — Christopher W Raimund
(74) *Attorney, Agent, or Firm* — DLA Piper LLP US (57) ABSTRACT

A clip-type stretching apparatus includes a main link device, a sub-link device, a standard rail, a pitch setting rail, and drive sprockets, the main link device including a first clip support member having a clip, the sub-link device having the clip, the standard rail defining a circulation route of the clip, the pitch setting rail setting a pitch between the first clip support members by a distance from the standard rail, the drive sprockets engaged with a drive roller provided in a first shaft member of the first clip support member and causing the first clip support member to travel.

1 Claim, 5 Drawing Sheets

(56) References Cited

FOREIGN PATENT DOCUMENTS

| JP | 59-49939 | 3/1984 |
|---|---|---|
| JP | 2008-44339 | 2/2008 |
| WO | WO 2008/090797 | 7/2008 |

OTHER PUBLICATIONS

Written Opinion issued in PCT/JP2016/064783 dated Aug. 2, 2016.
International Preliminary Report on Patentability issued in PCT/JP2016/064783 dated Nov. 21, 2017.
Office Action in CN Application No. 201680028251.8 dated Feb. 3, 2019.
Office Action KR Application No. 10-2017-7032879, dated Apr. 25, 2019.
Office Action CN Application No. 201680028251.8 dated Sep. 12, 2019.

* cited by examiner

CLIP-TYPE STRETCHING APPARATUS

This application is a Continuation Application of PCT Application No. PCT/JP2016/064783, filed May 18, 2016 and based upon and claiming the benefit of priority from prior Japanese Patent Application No. 2015-101752, filed May 19, 2015, the entire contents of all of which are incorporated herein by reference.

BACKGROUND OF THE INVENTION

1. Field of the Invention

The present invention relates to a clip-type stretching apparatus configured to stretch thermoplastic resin film, etc., in particular, a clip-type stretching apparatus which can simultaneously biaxially stretch a sheet-shaped member such as a sheet or film based on a preset stretching pattern.

2. Description of the Related Art

As the apparatus of this kind, Patent Literature 1 discloses a simultaneous biaxial stretching machine configured to continuously stretch a film or sheet (hereinafter, a sheet-shaped member). In the simultaneous biaxial stretching machine, two link devices are symmetrically arranged in planar view. The link device includes a plurality of clips configured to clip the edges of the sheet-shaped member, for example. The clips are endlessly connected by a chain.

The simultaneous biaxial stretching machine can simultaneously stretch the sheet-shaped member transversally and longitudinally. In the transversal stretching, the sheet-shaped member is transversally stretched by gradually increasing the distance between the right clip and the left clip. In the longitudinal stretching, the sheet-shaped member is longitudinally stretched by extending the link devices and gradually increasing the clip pitch.

In the simultaneous biaxial stretching machine of Patent Literature 1, the link device further includes a plurality of links (master links), and a plurality of clips are attached in such a manner that each clip is interposed between the two adjacent links. As the link device extends, the clip extends, accordingly. Further, the simultaneous biaxial stretching machine further includes a plurality of slave links, and each slave link is not connected to a roller which rolls along a guide rail.

According to this structure, the speed of the machine can be increased by adopting a roller (bearing) having a large load capacity. In addition, the chip pitch at a time of clipping a pre-stretched film in the inlet of the machine can be reduced. Consequently, the side edges of the sheet-shaped member can be prevented from becoming wavy.

CITATION LIST

Patent Literature

Patent Literature 1: JP S44-7155 B1

BRIEF SUMMARY OF THE INVENTION

Technical Problem

The simultaneous biaxial stretching machine of Patent Literature 1 includes a clip side guide rail, a counter clip side guide rail and a sprocket.

The clip side guide rail is configured to roll a roller provided on the clip side of the link device. On the other hand, the counter clip side guide rail is configured to roll a roller provided on the counter clip side of the link device. Here, the gap between the two guide rails is adjusted. The link device is extended. In this way, the clip pitch can be increased.

Further, the sprocket is configured to circulate the link device along the two guide rails. The sprocket is engaged with the roller provided on the counter clip side.

According to this simultaneous biaxial stretching machine, the posture of the link device and the manner of extending of the link device can be defined by three rollers. In this case, among the three rollers, two rollers roll along the counter clip side guide rail, and are adjacent to each other. The remaining one roller rolls along the clip side guide rail, and rolls between the two rollers which roll along the counter clip side guide rail.

In a preheating zone or a heat-treating zone of the simultaneous biaxial stretching machine, the two guide rails are linearly arranged at a constant distance. Therefore, the slave link, which is not connected to the rollers rolling along the guide rails, also moves along the guide rails.

In a stretching zone between the preheating zone and the heat-treating zone, the gap between the two guide rails is gradually narrowed. In the connecting portion with the preheating zone, the two guide rails are curved, and the gap is gradually narrowed. Therefore, the link passing through the preheating zone can smoothly transfer to the stretching zone.

In this connecting portion of the stretching zone, the curvature of the counter clip side guide rail is relatively greater than the curvature of the clip side guide rail. Therefore, the gap between the two clip side rollers of the adjacent links is unintentionally increased. Consequently, the difference between the movement locus of the clip of the link (master link) and the movement locus of the clip of the slave link is increased in this connecting portion. As a result, the stretching state of a portion clipped with the clip of the link (master link) and the stretching state of a portion clipped with the clip of the slave link differ from each other.

The present invention aims to provide a clip-type stretching apparatus which can simultaneously biaxially stretch a sheet-shaped member in accordance with a preset stretching pattern of the sheet-shaped member.

Solution to Problem

To achieve this aim, a clip-type stretching apparatus of the present invention includes a main link device, a sub-link device, a standard rail, a pitch setting rail, and a drive sprocket, the main link device including a first clip support member having a clip, the sub-link device having a clip, the standard rail configured to define a clip circulation route, the pitch setting rail configured to set a pitch between the first clip support members by a distance from the standard rail, the drive sprocket being engaged with a drive roller provided in a first shaft member of the first clip support member and configured to cause the first clip support member to travel.

Advantages Effects of Invention

According to the present invention, the drive sprocket is engaged with the drive roller of the first shaft member. Therefore, it is possible to cause the endlessly-connected first clip support members to travel along the circulation route. At this time, in the connecting portion of the stretching zone, the pitch (gap) between the adjacent first shaft members will not be unintentionally increased. Therefore, the difference between the traveling locus of the first shaft member and the traveling locus of a sixth shaft member, which is not provided with an engaging element, can be held within a tolerable range. In this case, the difference between the traveling locus of the clip provided in the first clip support member and the traveling locus of the clip provided in a second clip support member will fall within a tolerable range. As a result, a problem such as a variance of a film stretching state in the connecting portion of the stretching zone can be prevented. Consequently, a sheet-shaped member can be simultaneously biaxially stretched based on a preset stretching pattern.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

One Embodiment

As shown in FIGS. 1 to 5, a clip-type stretching apparatus 1 includes endless loops 11R and 11L on the right side and the left side in planar view. A plurality of clips 10 are movably provided in the endless loops 11R and 11L on the right side and the left side. The clip 10 is configured to clip a sheet-shaped member such as a stretching target sheet or film. As viewed from an inlet 1a for the sheet-shaped member, the right endless loop is referred to as the right endless loop 11R and the left endless loop is referred to as the left endless loop 11L.

Figure 1:
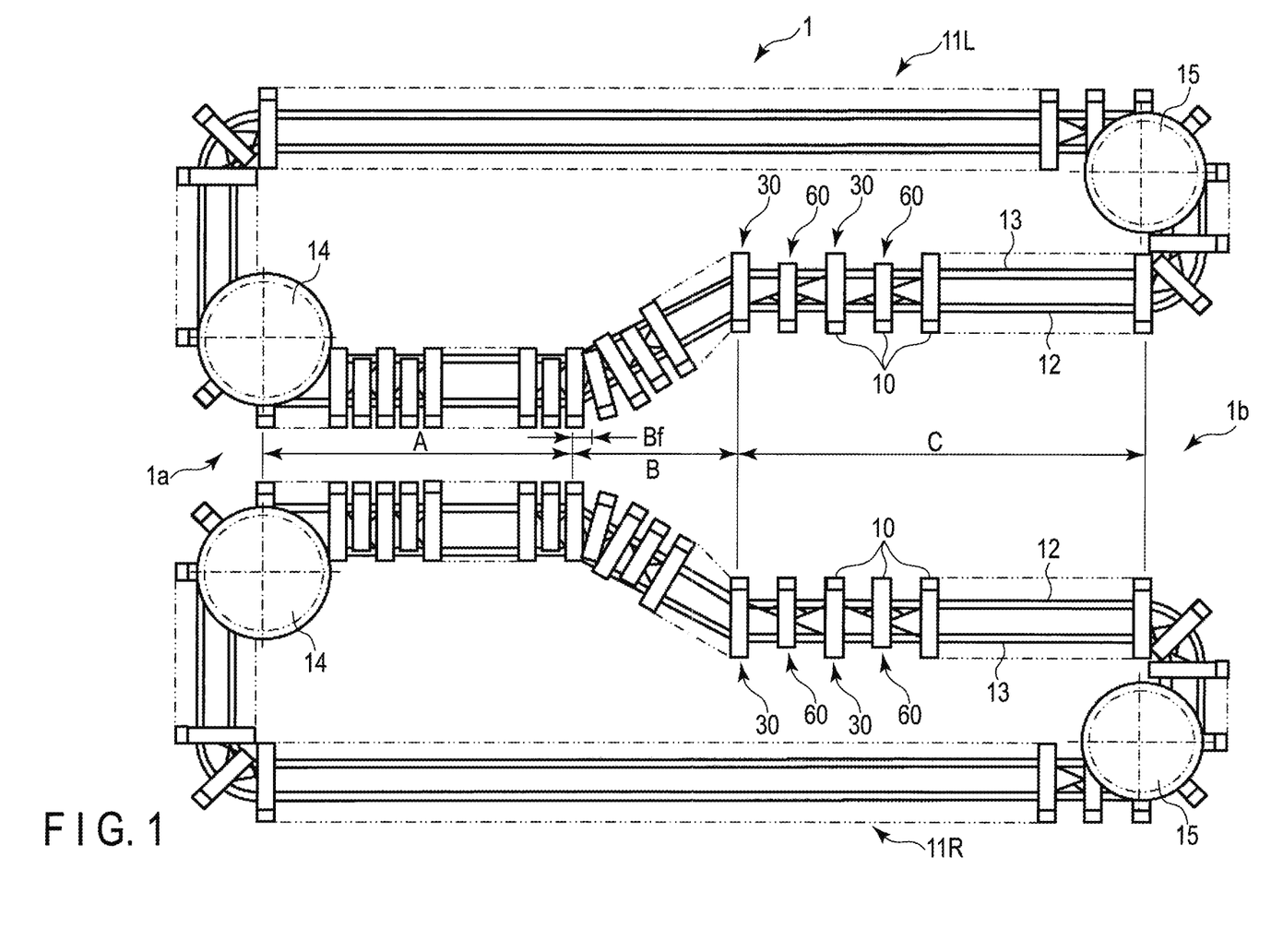
FIG. 1 is a plan view showing the general structure of a clip-type stretching apparatus according to the present invention.

The clips 10 of the right endless loop 11R and the left endless loop 11L are guided along standard rails 12 and are circulated in loops, respectively. The right endless loop 11R moves in a clockwise direction. The left endless loop 11L moves in a counterclockwise direction. Both edges of the pre-stretched sheet-shaped member are clipped with the clips 10 in the inlet 1a, and after being stretched, the stretched sheet-shaped member is released from the clips 10 in an outlet 1b.

A preheating zone A, a stretching zone B and a heat-treating zone C are arranged in this order from the inlet 1a side (upstream side) to the outlet 1b side (downstream side) of the sheet-shaped member.

In the preheating zone A, the distance between the right endless loop 11R and the left endless loop 11L is equivalent to a transversal stretching early stage width and is set to be relatively small. The right endless loop 11R and the left endless loop 11L are parallel to each other throughout the preheating zone A.

In the stretching zone B, the distance between the right endless loop 11R and the left endless loop 11L are gradually increased from the preheating zone A side to the heat-treating zone C. The right endless loop 11R and the left endless loop 11L are antiparallel to each other throughout the stretching zone B. In the stretching zone B, the distance between the right endless loop 11R and the left endless loop 11L is set to be equivalent to the transversal stretching early stage width at a stretching starting end (connecting end with the preheating zone A) and is set to be equivalent to a transversal stretching final stage width at a stretching finishing end (connecting end with the heat-treating zone C).

Here, in a connecting portion Bf to the preheating zone A, the right endless loop 11R and the left endless loop 11L are curved in such a manner as to project toward the clip 10 side. In this way, the clips 10 passing thorough the preheating zone A can smoothly transfer to the stretching zone B.

In the heat-treating zone C, the distance between the right endless loop 11R and the left endless loop 11L is equivalent to the transversal stretching final stage width and is set to be relatively large. The right endless loop 11R and the left endless loop 11L are parallel to each other throughout the heat-treating zone C.

Next, the detailed structure of the clip-type stretching apparatus 1 will be described with reference to FIGS. 2 to 4.

The clip 10 is configured to clip a sheet-shaped member W. The clip 10 includes a clip main body 20 having the shape of a yoke, a lower fixed clip member 21 fixed to the clip main body 20, a movable lever 23 rotatably attached to the clip main body 20 by means of a pin 22, and an upper movable clip member 25 swingably attached to the lower end of the movable lever 23 by means of a pin 24.

A side edge of the sheet-shaped member W can be held and supported between the lower fixed clip member 21 and the upper movable clip member 25. In this way, the clip 10 can hold and support the sheet-shaped member W and release the sheet-shaped member W from the supported state.

Note that half of the clips 10 are individually provided in main link devices 30, and the other half of the clips 10 are individually provided in sub-link devices 60.

"Main Link Device 30"

Figure 2:
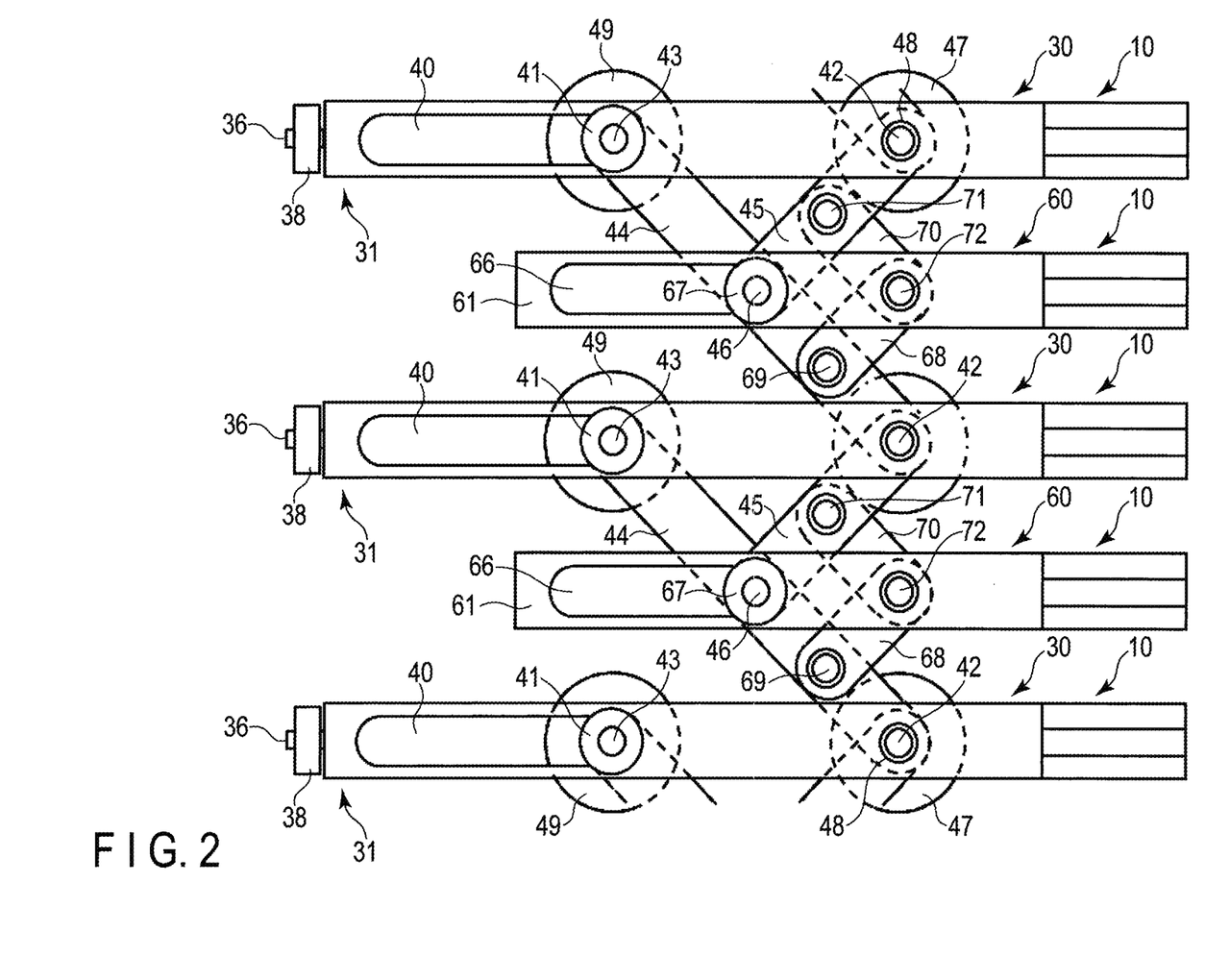
FIG. 2 is a plan view showing the structure of a main link device and the structure of a sub-link device shown in FIG. 1.
Figure 3:
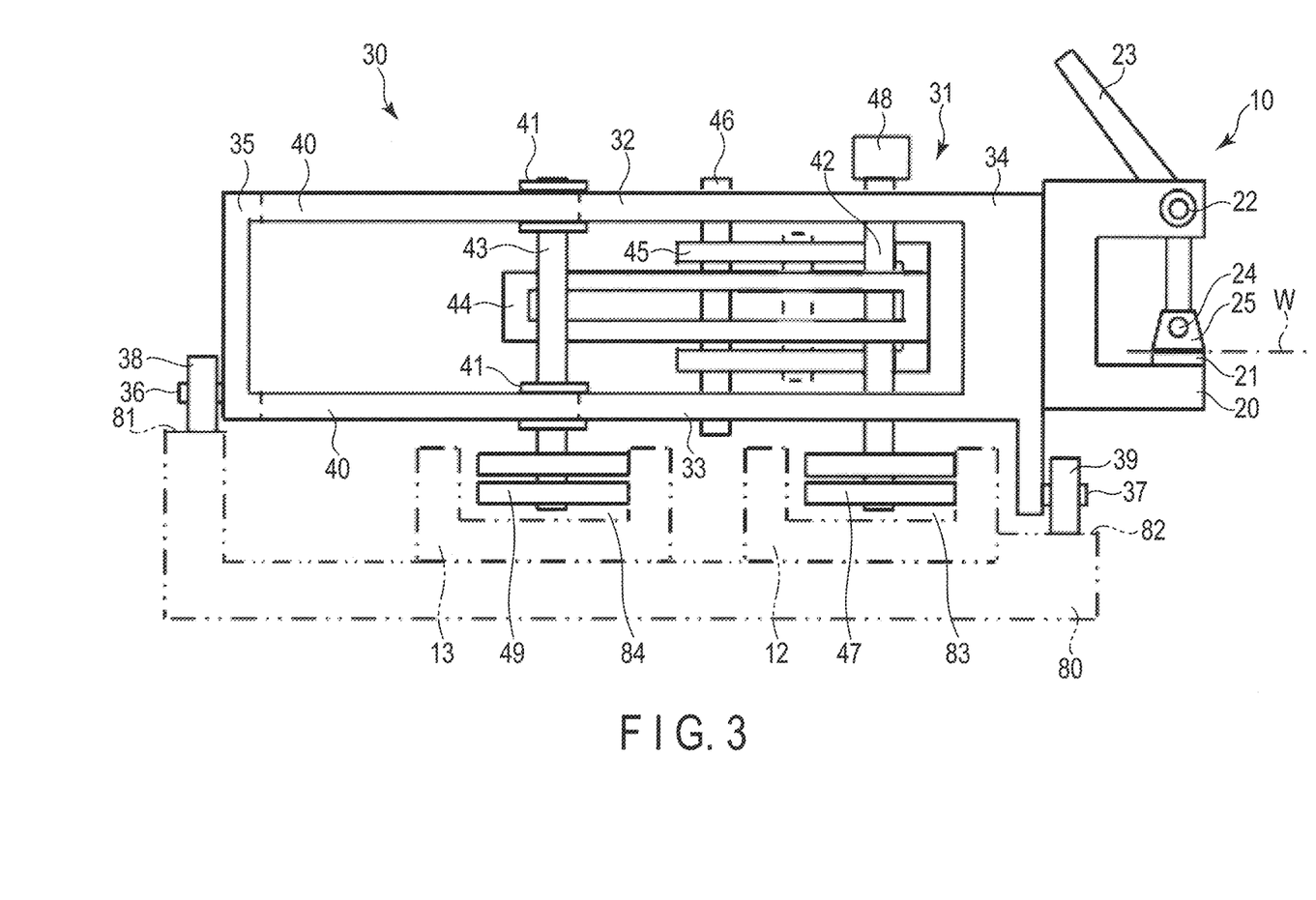
FIG. 3 is side view of the main link device shown in FIG. 1.

As shown in FIGS. 2 and 3, the main link device 30 includes a first clip support member 31 having a rectangular shape. The first clip support member 31 is configured to support the clip 10. The clip 10 is supported on one end portion (front side) of the first clip support member 31 in the longitudinal direction.

The first clip support member 31 has a frame structure which is closed with an upper beam 32, a lower beam 33, a front wall 34 and a back wall 35 (see FIG. 3). The frame structure is robust and excellent in rigidity. Traveling wheels 38 and 39 are provided at both ends (the front wall 34 and the back wall 35) of the first clip support member 31. The traveling wheels 38 and 39 are rotatably supported on shafts 36 and 37, respectively. The traveling wheels 38 and 39 rotate on traveling surfaces 81 and 82 which are horizontal and formed on a base 80. The traveling surfaces 81 and 82 are entirely parallel to the standard rail 12.

First long holes 40 are formed on the other end side (back side) of the upper beam 32 and the other end side (back side) of the lower beam 33, respectively. The upper and lower first long holes 40 are elongated in the longitudinal direction. First sliders 41 are slidably engaged with the upper and lower first long holes 40, respectively.

In proximity to the one end portion (clip 10 side) of the first clip support member 31, one first shaft member 42 is perpendicularly provided through the upper beam 32 and the lower beam 33. One second shaft member 43 is perpendicularly provided through the upper and lower first sliders 41 of the first clip support member 31.

One end of a first link member 44 is pivotally connected to the first shaft member 42 of the first clip support member 31. The other end of the first link member 44 is pivotally connected to the second shaft member 43 of the adjacent first clip support member 31 provided on the downstream side in the conveying direction of the sheet-shaped member W.

Further, a third shaft member 46 is provided in an intermediate portion of the first link member 44. One end of a second link member 45 is pivotally connected to the third shaft member 46. The other end of the second link member 45 is pivotally connected to the first shaft member 42 of the adjacent first clip support member 31 provided on the downstream side in the conveying direction of the sheet-shaped member W. In this case, the distance between the third shaft member 46 and the first shaft member 42 in the second link member 45 is set to be the same as the distance between the third shaft member 46 and the first shaft member 42 in the first link member 44.

In this structure, if the first slider 41 is moved to the other end side (counter clip side) of the first clip support member 31 by a link mechanism formed by the first link member 44 and the second link member 45, the pitch between the adjacent first clip support members 31 is reduced, accordingly. Further, as shown in FIG. 2, if the first slider 41 is moved to the one end side (clip side) of the first clip support member 31, the pitch between the first clip support members 31 which are adjacent to each other in the conveying direction of the sheet-shaped member W is increased, accordingly.

A guide roller (first engaging element) 47 is rotatably provided at the lower end of the first shaft member 42. The guide roller 47 is engaged with a groove 83 of the grooved standard rail 12. The standard rail 12 (groove 83) is provided on the base 80. The standard rail 12 (groove 83) defines the circulation route of the clip 10.

A drive roller 48 is rotatably provided at the upper end of the first shaft member 42. The drive roller 48 is selectively engaged with drive sprockets 14 and 15 (see FIG. 1). The drive sprockets 14 and 15 are driven and rotated by an electric motor (not shown). The drive sprockets 14 and 15 are selectively engaged with the drive roller 48 of the first clip support member 31. At this time, power which causes the first clip support member 31 to travel along the circulation route is applied to the first clip support member 31. In this way, the first clip support member 31 is made to travel along the circulation route.

A pitch setting roller (second engaging element) 49 is rotatably provided at the lower end of the second shaft member 43. The pitch setting roller 49 is engaged with a groove 84 of a grooved pitch setting rail 13. The pitch setting rail 13 (groove 84) is provided on the base 80. The pitch setting rail 13 (groove 84) sets the position of the first slider 41 in the first long hole 40.

The pitch setting rail 13 has the function of determining the position of the first slider 41 in the first long hole 40 by the distance from the standard rail 12. The pitch setting rail 13 is configured to variably set the pitch between the first clip support members 31 which are adjacent to each other in the conveying direction of the sheet-shaped member W. For example, if the distance between the pitch setting rail 13 and the standard rail 12 is increased, that is, if the pitch setting rail 13 is moved away from the standard rail 12, the first slider 41 is moved to the other end side (counter clip side) of the first clip support member 31. In this way, the pitch between the first clip support members 31 is reduced.

On the other hand, if the distance between the pitch setting rail 13 and the standard rail 12 is reduced, that is, if the pitch setting rail 13 is moved closer to the standard rail 12, the first slider 41 is moved to the one end side (clip side) of the first clip support member 31. In this way, the pitch between the first clip support members 31 is increased.

Here, as shown in FIG. 1, the distance between the pitch setting rail 13 and the standard rail 12 is set to be a maximum value throughout the preheating zone A. In the preheating zone A, the pitch setting rail 13 is set in such a manner that the pitch between the first clip support members 31 will be a minimum.

The stretching zone B is provided between the stretching starting end (connecting end with the preheating zone A) and the stretching finishing end (connecting end with the heat-treating zone C).

At the stretching starting end (connecting end with the preheating zone A), the distance between the pitch setting rail 13 and the standard rail 12 is a maximum value, and the pitch between the first clip support members 31 is a minimum. On the other hand, at the stretching finishing end (connecting end with the heat-treating zone C), the distance between the pitch setting rail 13 and the standard rail 12 is a minimum value, and the pitch between the first slip support members 31 is a maximum.

In other words, the stretching zone B has such a structure that the distance between the pitch setting rail 13 and the standard rail 12 is gradually reduced from the stretching starting end to the stretching finishing end. That is, the stretching zone B has such a structure that the pitch between the first clip support members 31 is gradually increased from the stretching starting end to the stretching finishing end.

The distance between the pitch setting rail 13 and the standard rail 12 is set to be a maximum value throughout the heat-treating zone C. In the heat-treating zone C, the pith setting rail 13 is set in such a manner that the pitch between the first clip support members 31 will be a maximum.

The standard rail 12 and the pitch setting rail 13 are arranged in the above-described manner. In the endless loops 11R and 11L provided with the large number of clips 10 for clipping the sheet-shaped member W, the circulation routes of the clips 10 are set, respectively. A stretching pattern to be applied to the sheet-shaped member W from the inlet 1a to the outlet 1b is defined, accordingly.

"Sub-Link Device 60"

Figure 4:
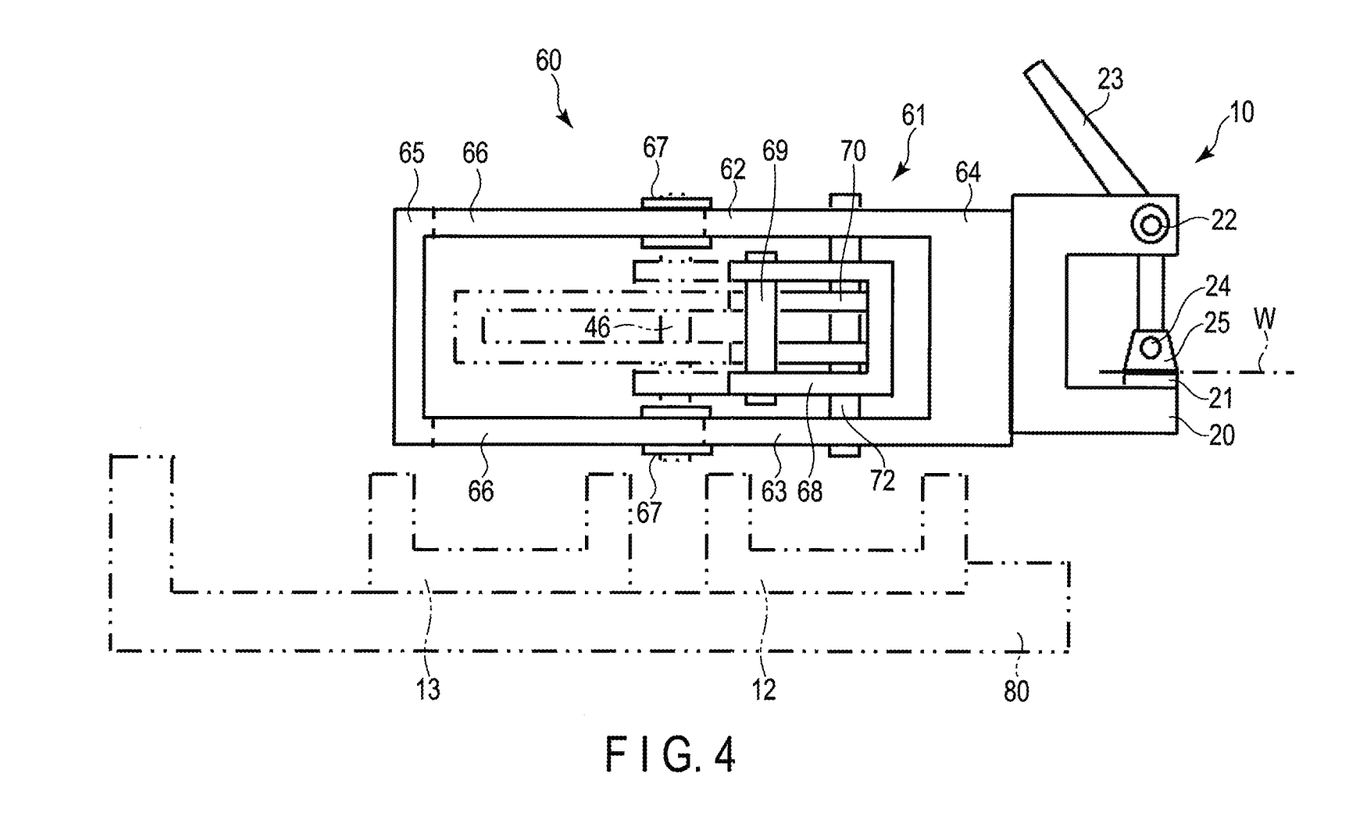
FIG. 4 is a side view of the sub-link device shown in FIG. 1.

As shown in FIGS. 2 and 4, the sub-link device 60 includes a second clip support member 61 having a rectangular shape. The second clip support member 61 is configured to support a clip 10. The clip 10 is supported on one end portion (front side) of the second clip support member 61 in the longitudinal direction.

The second clip support member 61 has a frame structure which is closed with an upper beam 62, a lower beam 63, a front wall 64 and a back wall 65 (see FIG. 4). The frame structure is robust and excellent in rigidity.

Second long holes 66 are formed on the other end side (back side) of the upper beam 62 and the other end side (back side) of the lower beam 63, respectively. The upper and lower second long holes 66 are elongated in the longitudinal direction. Second sliders 67 are slidably engaged with the upper and lower second long holes 66. One third shaft member 46 is perpendicularly provided through the upper and lower second sliders 67.

Further, the sub-link device 60 includes a third link member 68 and a fourth link member 70.

One end of the third link member 68 is rotatably connected to an intermediate portion of the first link member 44. The intermediate portion of the first link member 44 is set to be intermediate between the first shaft member 42 and the third shaft member 46. A fourth shaft member 69 is provided in the intermediate portion. In this way, one end of the third link member 68 is pivotally connected to the fourth shaft member 69.

One end of the fourth link member 70 is rotatably connected to an intermediate portion of the second link member 45. The intermediate portion of the second link member 45 is set to be intermediate between the first shaft member 42 and the third shaft member 46. A fifth shaft member 71 is provided in the intermediate portion. In this way, one end of the fourth link member 70 is pivotally connected to the fifth shaft member 71.

The distance between the fourth shaft member 69 and a sixth shaft member 72 in the third link member 68 is set to be the same as the distance between the fourth shaft member 69 and he first shaft member 42 in the first link member 44.

The distance between the fifth shaft member 71 and the sixth shaft member 72 in the fourth link member 70 is set to be the same as the distance between the fifth shaft member 71 and the first shaft member 42 in the second link member 45.

The other end of the third link member 68 and the other end of the fourth link member 70 are pivotally connected to each other by the sixth shaft member 72. The sixth shaft member 72 is provided in proximity to one end portion (clip 10 side) of the second clip support member 61 through the upper beam 62 and the lower beam 63. Note that the distance between the sixth shaft member 72 of the second clip support member 61 and the clip 10 is set to be the same as the distance between the first shaft member 42 of the first clip support member 31 and the clip 10.

From the above, in the sub-link device 60, the third link member 68 is pivotally connected to the first link member 44 of the main link device 30, and the fourth link member 70 is pivotally connected to the second link member 45 of the main link device 30. The sub-link device 60 is configured to extend as the main link device 30 extends. Further, the sixth shaft member 72 of the sub-link device 60 is located on a line connecting the first shaft members 42 of the adjacent main link devices 30. That is, the sixth shaft member 72 is located in an intermediate portion (intermediate point) between the adjacent first shaft members 42.

As described above, the right endless loop 11R and the left endless loop 11L provided with the large number of clips 10 include the large number of endlessly-connected main link devices 30 and the plurality of sub-link devices 60, respectively. Each sub-link device 60 is provided between the adjacent two main link-devices 30.

"Operation of Clip-Type Stretching Apparatus 1"

The drive sprockets 14 and 15 of the right endless loop 11R are driven and rotated in the clockwise direction by an electronic motor (not shown). The drive sprockets 14 and 15 of the left endless loop 11L are drive and rotated in the counterclockwise direction by an electronic motor (not shown). The drive roller 48 of the first clip support member 31 is engaged with the drive sprockets 14 and 15.

In this case, traveling force is applied from the drive sprockets 14 and 15 to the first clip support member 31 via the drive roller 48. In this way, the right endless loop 11R moves in the clockwise direction. The left endless loop 11L moves in the counterclockwise direction. As a result, the pre-stretched sheet-shaped member W is taken in from the inlet 1a and is held between the right endless loop 11R and the left endless loop 11L.

In the inlet 1a, the side edges of the sheet-shaped member W are clipped (clip on) with the clips 10 of the right endless loop 11R and the left endless loop 11L.

Here, in accordance with the movements of the right endless loop 11R and the left endless loop 11L, that is, the movement of the main link device 30 guided along the standard rail 12 and the associated movement of the sub-link device 60, the sheet-shaped member W firstly enters the pre-heating zone A.

As described above, the pitch setting rail 13 and the standard rail 12 are opposed to each other and parallel to each other throughout the pre-heating zone A. The distance between the pitch setting rail 13 and the standard rail 12 is set to be a maximum value. In the pre-heating zone A, the pitch setting rail 13 is set in such a manner that the pitch between the first clip support members 31 will be a minimum.

Therefore, the sheet-shaped member W is not stretched transversally or longitudinally but is only preheated in the pre-heating zone A.

After being pre-heated, the sheet-shaped member W enters the stretching zone B.

As described above, in the stretching zone B, the distance between the right endless loop 11R and the left endless loop 11L is gradually increased from the pre-heating zone A side to the heat-treating zone C. The stretching zone B has such a structure that the distance between the pitch setting rail 13 and the standard rail 12 is gradually reduced from the stretching starting end to the stretching finishing end. That is, the stretching zone B has such a structure that the pitch between the first clip support members 31 is gradually increased from the stretching starting end to the stretching finishing end.

In this structure, the first slider 41 of the main link device 30 moves to one end side (click side) of the first click support member 31. Therefore, the sheet-shaped member W is simultaneously stretched transversally and longitudinally in the stretching zone B. At this time, the sub-link device 60 extends in such a manner that the sixth shaft member 72 will be positioned in the intermediate portion of the line connecting the first shaft members 42 of the adjacent main link devices 30.

After being simultaneously biaxially stretched, the sheet-shaped member W enters the heat-treating zone C.

As described above, the distance between the pitch setting rail 13 and the standard rail 12 is set to be a maximum value throughout the heat-treating zone C. In the heat-treating zone C, the pitch setting rail 13 is set in such a manner that the pitch between the first clip support members 31 will be a maximum.

Therefore, the sheet-shaped member W is not stretched transversally or longitudinally but is only be treated with heat in the heat-treating zone C.

In the outlet 1b at the finishing end of the heat-treating zone C, the sheet-shaped member W is released (clip off) from the clips 10 of the right endless loop 11R and the left endless loop 11L. Subsequently, the sheet-shaped member W proceeds straight ahead. Further, the main link device 30 and the sub-link device 60 are guided along the standard rail 12 and travel in a loop.

Effect of Embodiment

Figure 5:
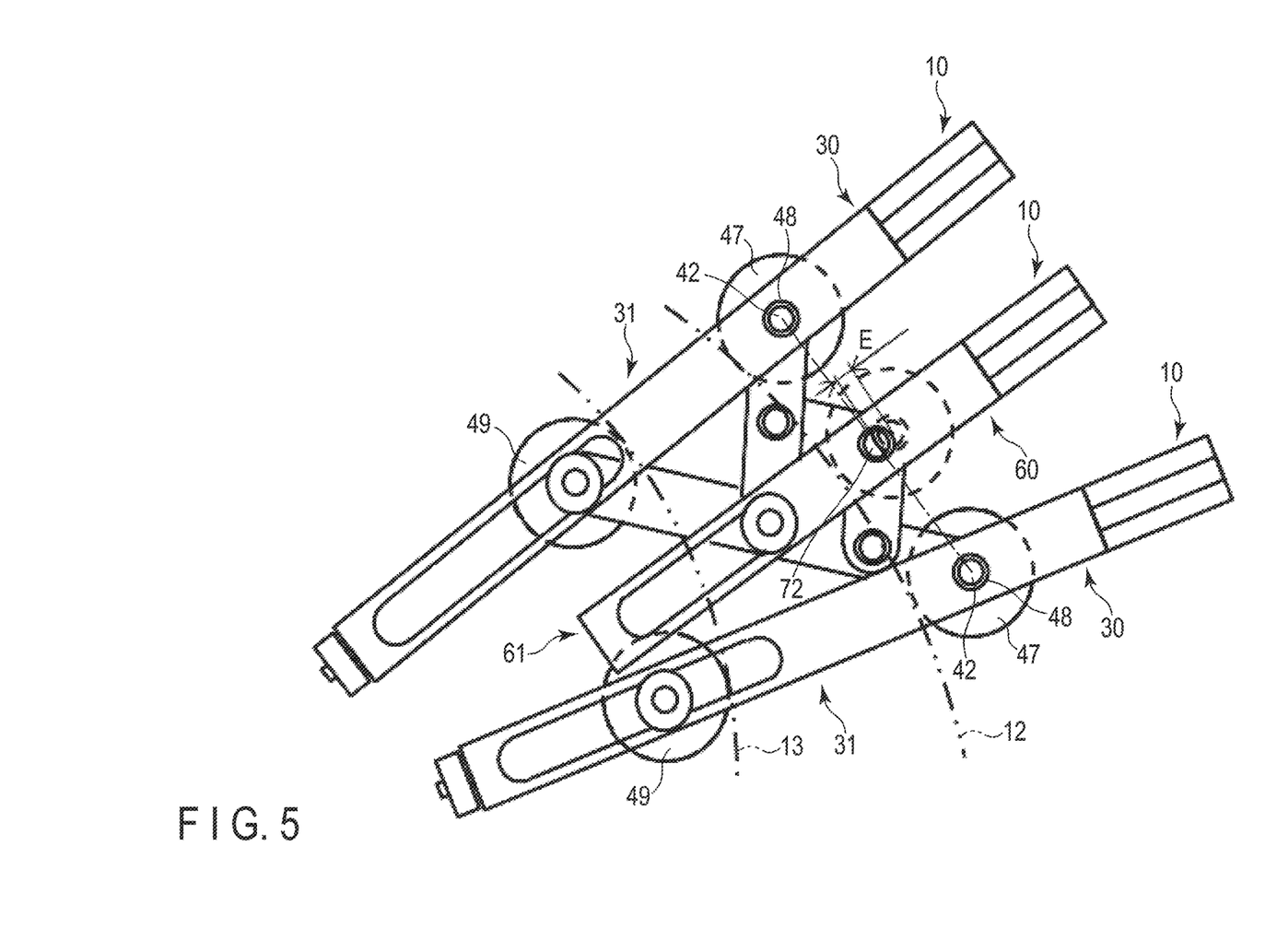
FIG. 5 is a plan view showing the positional relationship between the main link device and the sub-link device in a connecting portion of a stretching zone shown in FIG. 1.

The drive sprockets 14 and 15 are engaged with the drive roller 48 provided in the first shaft member 42 located on the clip 10 side. In this way, the first clip support member 31 is made to travel along the circulation route. As a result, as shown in FIG. 5, when the clip 10 passes the connecting portion Bf of the stretching zone B, the posture of the main device 30 can be stabilized by three points, namely, two guide rollers (first engaging elements) 47 and one pitch setting roller (second engaging element) 49.

In this case, the distance between the standard rail 12 and the pitch setting rail 13 is adjusted. The distance between the adjacent first shaft members 42 can be adjusted, accordingly. Simultaneously, a difference E between the traveling locus of the first shaft member 42 and the traveling locus of the sixth shaft member 72, which is not provided with an engaging element, can be held within a tolerable range. At this time, the difference between the traveling locus of the clip 10 provided in the first clip support member 31 and the traveling locus of the clip 10 provided in the second support member 61 also falls within a tolerable range.

The fourth shaft member 69, which pivotally connects the first link member 44 of the main link device 30 to the third link member 68 of the sub-link device 60, is set to be intermediate between the first shaft member 42 and the third shaft member 46. Further, the fifth shaft member 71, which pivotally connects the second link member 45 of the main link device 30 to the fourth link member 70 of the sub-link device 60, is also set to be intermediate between the first shaft member 42 and the third shaft member 46.

Here, in a direction orthogonal to the standard rail 12 and the pitch setting rail 13, the distance between the standard rail 12 and the pitch setting rail 13 is assumed to be L. In this case, the distance of the drive roller 48 of the first link member 44 which is engaged with the drive sprockets 14 and 15, from the fourth shaft member 69 and the fifth shaft member 71 is L/4 as viewed in the above-described orthogonal direction. A position at the distance (L/4) is close to the point of application of the power which causes the first clip support member 31 to travel along the circulation route. As a result, the sub-link device 60 can be stably extended (contracted and expanded).

In this way, it is possible to achieve simultaneous biaxial stretching in accordance with the preset stretching pattern of the sheet-shaped member W while preventing a conventional problem such as a variance of the film stretching state in the connecting portion Bf of the stretching zone B.

STANDARD SIGNS LIST

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

1: Clip-type stretching device
10: Clip
11L, 11R: Endless loop
12: Standard rail
13: Pitch setting rail
14, 15: Drive sprocket
30: Main link device
31: First clip support member
32: Upper beam
33: Lower beam
34: Front wall
35: Back wall
40: First long hole
41: First slider
42: First shaft member
43: Second shaft member
44: First link member
45: Second link member
46: Third shaft member
47: Guide roller
48: Drive roller
49: Pitch setting roller
60: Sub-link device
61: Second clip support member
62: Upper beam
63: Lower beam
64: Front wall
65: Back wall
66: Second long hole
67: Second slider
68: Third link member
69: Fourth shaft member
70: Fourth link member
71: Fifth shaft member
72: Sixth shaft member
80: Base
83, 84: Groove

What is claimed is:

1. A clip-type stretching apparatus configured to clip both side edge portions of a sheet-like member with a plurality of clips arranged on a right side and a left side and stretch the sheet-like member, the clip-type stretching apparatus comprising:

a plurality of first clip support members, each of the first clip support members having a rectangular shape, and comprising a clip of the plurality of clips in one end portion in a longitudinal direction and a first long hole at other end side, the clip being configured to clip the sheet-shaped member, the first long hole being elongated in a longitudinal direction;

at least one first shaft member provided in proximity to the one end portion of at least one of the first clip support members;

at least one first engaging element rotatably provided at the at least one first shaft member;

at least one first slider slidably engaged with the first long hole of at least one of the first clip support members;

at least one second shaft member provided in at least one of the first sliders;

at least one second engaging element rotatably provided at the at least one second shaft member;

at least one first link member having one end pivotally connected to the first shaft member provided in at least one of the first clip support members, and another end pivotally connected to the second shaft member provided in at least one adjacent first clip support member;

at least one second link member having one end pivotally connected to a third shaft member provided in at least one of an intermediate portion of the first link member, and another end pivotally connected to the first shaft member provided in the adjacent at least one first clip support member;

at least one third link member having one end pivotally connected to a fourth shaft member provided in at least one intermediate portion between at least one of the first shaft members and the third shaft member of at least one of the first link members;

at least one fourth link member having one end pivotally connected to at least one fifth shaft member provided in at least one intermediate portion between at least one of the first shaft members and the third shaft member of at least one of the second link members;

at least one sixth shaft member configured to pivotally connect another end of at least one of the third link members and another end of at least one of the fourth link members to each other;

a plurality of second clip support members, each of the second clip support members having a rectangular shape, and comprising a clip of the plurality of clips in one end portion in a longitudinal direction, the sixth shaft member in proximity to the one end portion and a second slider, the clip being configured to clip the sheet-shaped member, the second slider being slidably engaged with a second long hole and connected to at least one of the third shaft members, the second long hole being formed at another end side of the clip and elongated in a longitudinal direction;

a standard rail engaged with the first engaging element provided in at least one of the first shaft members and configured to define a circulation route of the clip;

a pitch setting rail provided along the standard rail, engaged with the second engaging element provided in at least one of the second shaft members, and configured to variably set a pitch between adjacent first clip support members by a distance from the standard rail;

a drive roller provided at the at least one first shaft member; and at least one drive sprocket with which the drive roller is selectively engaged to cause the at least one of the first clip support members to travel along the circulation route, in a direction orthogonal to the standard rail and the pitch setting rail, a distance between the drive roller, and the fourth shaft member, and the fifth shaft member being a quarter of a distance between the standard rail and the pitch setting rail.

* * * * *